March 4, 1924.
N. T. BACON
1,485,475
APPARATUS FOR CONCENTRATING SOLUTIONS
Filed July 19, 1918
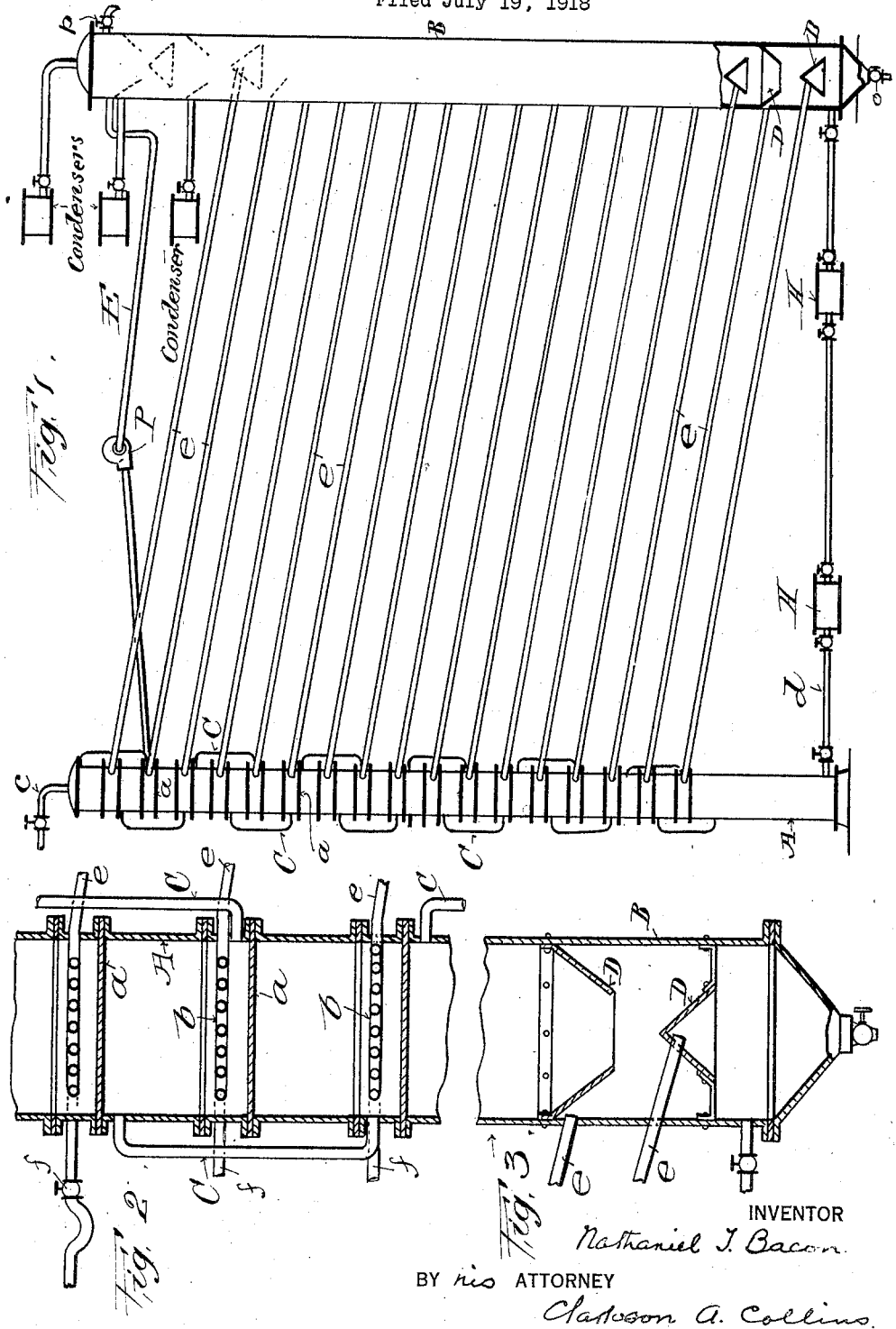
INVENTOR
Nathaniel T. Bacon
BY his ATTORNEY
Clarkson A. Collins Patented Mar. 4, 1924.

1,485,475

UNITED STATES PATENT OFFICE.

NATHANIEL T. BACON, OF PEACE DALE, RHODE ISLAND, ASSIGNOR TO THE SOLVAY PROCESS COMPANY, OF SOLVAY, NEW YORK, A CORPORATION OF NEW YORK.

APPARATUS FOR CONCENTRATING SOLUTIONS.

Application filed July 19, 1918. Serial No. 245,634.

*To all whom it may concern:*

Be it known that I, NATHANIEL T. BACON, a citizen of the United States, residing at Peace Dale, in the county of Washington and State of Rhode Island, have invented certain new and useful Improvements in Apparatus for Concentrating Solutions, of which the following is a specification.

In the treatment of solutions having contents of value, such as the waters of Searles Lake and similar deposits, the desirability of using multiple effect evaporation in concentrating the solution, on account of the great fuel economy is well known. The use of multiple effect evaporators is, however, in many cases, rendered practically impossible by two principal difficulties. The first of these lies in the great difference in boiling point under the same pressure between pure water and the solution. The steam given off from the solution, although at the temperature of the solution itself is, nevertheless, only in the condition of superheated steam, and when cooled loses temperature without condensing until it falls to the condensing temperature of saturated steam under the given pressure and can only give up its latent heat to a liquid below this temperature.

There is also a secondary difficulty due to the difference in temperature between the liquor being heated by condensation and the steam condensation point which in practice is considerable, the working difference in temperature from one effect to the next being from 15° C. to 20° C., so that the number of effects practically useful is small.

When this difficulty is exaggerated, as it frequently is, by incrustation of the condensing tubes on the one side, or the evaporating tubes on the other, or both, whereby the conductivity is greatly reduced, it becomes practically impossible to use multiple effects, especially with solutions in which the boiling point is carried far above that of water.

The object of my improvements is to obviate these difficulties and at the same time retain the advantages of concentrating with a multiple effect.

A further object of my improvements is to increase the size of the crystals formed upon concentration of the solution and this I accomplish by causing the crystals to be formed in an upwardly moving column of the solution which is constantly supersaturated and is at the same time cooled so that the crystals as soon as formed, pass downward through strata of liquid hotter than themselves, as will be more fully hereinafter explained.

My invention will be best understood by reference to the accompanying drawings, Figure 1 of which is a diagrammatic representation of the apparatus as a whole.

Figure 2 shows in section an enlarged view of details of the preheating column and Figure 3 is a sectional view showing on an enlarged scale details of construction of the concentrating column.

Referring to the drawings, A, B, represent two columns, or towers, the former of which I call the preheating column and the latter the concentrating or evaporating column. These should be of such considerable height, say approximately 100 feet, that liquor at the bottom of the columns may be raised to a high temperature without reaching the boiling point at the pressure to which it is subjected by the superimposed contents of the columns.

The preheating column A is divided into compartments by partitions $a, a, a$, which are provided with steam coils, $b, b, b$, provided with draw-off cocks $f$, and located preferably near the bottom of each compartment. From the top of each compartment an overflow pipe or passage, C, leads to the next compartment below, which it enters near its bottom, whereby the liquor, or solution, to be treated, which enters near the top of the column through a pipe, $c$, flows downward from compartment to compartment until it reaches the bottom of the column.

The column, A, is connected with the lower part of column, B, by pipe, $d$, which is provided with heating means, H, whereby the temperature of the liquid passing from column, A, may be somewhat raised before it enters column, B.

The evaporating column, B, is provided with steam traps, D, D, each of which is connected by a pipe, $e$, with a corresponding steam coil in the column, A, located at a point where the temperature of the descending liquor in column, A, is lower than that of the steam admitted to the steam coil at that point, and located low enough down to prevent ebullition in the liquor at the steam temperature, and below the coil connected with the trap next above.

To insure the best results the walls of the columns and the pipes between the steam traps and the coils should be insulated so as to prevent loss of heat.

At the outset, liquor to be treated is admitted to the top of column, A, and passes downward therethrough and thence by pipe, $d$, to the bottom of column, B, being heated in its passage, as by steam admitted to the heaters, H, H. Thus the column, B, is filled with heated liquor. In case the operation of the heaters, H, H, is not sufficient to raise the liquor to the boiling point in the first instance the admission of liquor to column, A, is cut off when both columns are filled and the liquor is circulated from the top of column, B, back to column, A, until steam begins to be generated in column, B. This at first will be only in the upper part of column, B, where the pressure is lowest, but as the operation progresses the generation of steam will progress downward in column, B, until the entire mass of liquor passing through the heaters, H, H, will be raised to or slightly above the boiling point at the lowest of the steam traps, D, when the apparatus will be in full run. Any liquor present at the outset in pipes, $e$, and steam coils, $b$, may be driven out upon temporarily opening the draw-off cocks, $f$, by the pressure of steam from under traps, D. During this inception of the operation the liquor in column, A, will have been heated by steam from column, B, as the liquor therein reaches the boiling point, as is more fully hereinafter described.

The liquor to be concentrated enters the top of column, A, through pipe, $c$, and flows downward through it from compartment to compartment. In the upper compartment it is heated by steam passing through the coils, $b$, from the highest level of column, B, which it is cold enough to condense, whereby it is heated to the full extent of the latent heat of the steam eliminated in the corresponding level of the concentrating column, B. The heat of the steam is not sufficient to evaporate any of the liquor, which merely stores the latent heat thus recuperated in the shape of sensible heat. Thus the liquor passes down through the column, being heated from point to point by by the steam coming off from the column, B, at progressively increasing temperatures and passing into the coils, $b$. No boiling takes place since the increase of pressure by reason of the increase in height of the column of liquor is roughly equal to the increase in steam pressure in the concentrating column, B. When the liquor reaches the bottom of the column, A, its temperature will have been raised to an extent corresponding to the latent heat of volatilization of the steam generated in the column, B.

From the column, A, the liquor passes by pipe, $d$, to column, B, being heated, by means of heaters, H, H, which may be coils in the pipe heated by live steam, or any suitable form of heating device, to such an extent that it enters column, B, but slightly below its boiling point under the pressure at the base of the column.

As the liquor rises through the concentrating column, B, its boiling point is progressively lowered by reason of the decrease in pressure and steam is given off which is collected under the steam traps, D, and carried to the heating coils in the column, A, as above described. With fairly heavy solutions this lowering of the boiling point will correspond roughly to 1° C. for every foot which the liquor rises in the column, so that rising 6 feet the boiling point will be lowered about 6° and the temperature will fall to this extent. The reduction of temperature is accomplished by transformation of sensible heat to latent heat, which is transferred to the liquor in the column, A and thereby recovered in the form of sensible heat.

There may be a difference of as much as 25° C. between the temperature of the liquid in the column, B, and that of the liquid around the heating coils in the column, A, at the same level, which difference is by the action of the heaters, H. H.

As the ascending liquor approaches the top of the column a level is reached at which the temperature of the saturated steam resulting is too near that of the liquor descending in column A to be recuperated thereby. Beyond this point steam can be further evolved by condensation under high vacuum with cooling water, or, in case very low temperature is desired for the effluent at the top by other well known means so as to carry down the temperature without intervention of cooling tubes in the liquor.

The effluent from the top of the column, B, may either be carried back to the column, A, as by pump, P, through pipe E, to mix with the fresh feed, or it may be drawn off as through a pipe, $p$, for further or other treatment, as circumstances may make desirable.

Among the numerous advantages presented by my invention it may be pointed out that incrustation is avoided since the abstraction of heat does not occur through any solid surface but is due to the upward movement of the liquid itself, so that crystallization takes place in the body of the liquor and probably at the surfaces of the steam bubbles formed which locally reduce the volume of the liquid solvent thereby producing local supersaturation.

Priming is also reduced to a relatively insignificant amount as compared with an ordinary evaporator since the volume of steam released at any given point is largely reduced.

A further important advantage is found in the fact that as crystals are formed and begin to fall through the mass of liquid the cross section of the evaporating column is great enough so that the average ascending velocity of the liquid shall not evercome the tendency of the formed crystals to move continuously downward due to the influence of gravity and they will continually reach strata of liquid which are hotter than the crystals themselves, so that, in a menstruum constantly super-saturating by evaporation, these crystals tend to become centers of crystallization and to increase in size all the way down to the bottom, thus forming relatively coarse crystals, which in general are easier to handle than the fine ones produced by rapid chilling with tubes. It will be understood that the crystals formed collect in the bottom of the column, B, and are removed in any convenient manner as through outlet pipe, O.

Having thus described my invention what I claim as new and desire to secure by Letters Patent is:

1. In concentrating apparatus, the combination of a preheating column and means for causing a downward flow of liquid therethrough, an evaporating column, connected therewith, means for causing a flow of liquid from the preheating column to the evaporating column, means for causing an upward flow of liquid through the evaporating column and means for heating the liquid in the preheating column from the top downward, with steam of progressively higher temperature evolved in the evaporating column.

2. In concentrating apparatus, the combination of a preheating column and means for causing a downward flow of liquid therethrough, an evaporating column connected therewith, means for causing a flow of liquid from the preheating column to the evaporating column, means for causing an upward flow of liquid through the evaporating column and means for heating the liquid in the preheating column from the top downward with steam of progressively higher temperature evolved in the evaporating column, and means for returning the residual liquor from the evaporating to the preheating column.

3. In a concentrating apparatus the combination of a preheating column and means for causing a downward flow of liquid therethrough, an evaporating column connected therewith, means for causing a flow of liquid from the preheating column to the evaporating column, means for causing an upward flow of liquid through the evaporating column, means for separating steam, at successive points in the evaporating column and means for utilizing the steam generated in the evaporating column to heat the liquid in the preheating column.

4. In a concentrating apparatus the combination of a preheating column and means for causing a downward flow of liquid therethrough, an evaporating column connected therewith, means for causing a flow of liquid from the preheating column to the evaporating column, means for causing an upward flow of the liquid through the evaporating column, means for separating steam at successive points in the evaporating column and means for utilizing the steam generated in the evaporating column to progressively heat the liquid in the preheating column from the top downward.

5. In a concentrating apparatus the combination with a preheating column of means for causing a downward flow of liquid through the column, means for heating the liquid in the column from the top downward with steam of progressively higher temperature, baffles located in the preheating column and dividing it into compartments, and adapted to prevent convection currents of liquid from each of said compartments to each contiguous compartment of said compartments, and a pipe connecting the top of each compartment with the bottom of the compartment next below.

6. In a concentrating apparatus the combination of a preheating column, an evaporating column connected therewith, means for causing a downward flow of liquid of progressively increasing temperature through the preheating column and means for causing an upward flow of liquid of progressively decreasing temperature through the evaporating column.

7. In a concentrating apparatus the combination of a preheating column, an evaporating column connected therewith, means for causing a downward flow of liquid through the preheating column, means for causing an upward flow of liquid of progressively lower temperature through the evaporating column, means for separating and collecting steam at successive points in the evaporating column, and means for utilizing the steam generated in the evaporating column to heat the liquid in the preheating column from the top downward.

8. In a concentrating apparatus the combination of a preheating column, an evaporating column connected therewith, means for generating steam in the evaporating column, steam traps located in the evaporating column and heating coils located in the preheating column and operatively connected with said steam traps.

9. In a concentrating apparatus the combination of a preheating column and means for causing a downward flow of liquid therethrough, an evaporating column connected therewith, means for causing the liquid to flow from the preheating column to the evaporating column, means for heating the liquid as it passes to the evaporating column, means for causing an upward flow of liquid through the evaporating column and means for heating the liquid in the preheating column from the top downward with steam of progressively higher temperature.

10. In a concentrating apparatus the combination of a preheating column and means for causing a downward flow of liquid therethrough, an evaporating column connected therewith, means for causing a flow of liquid from the preheating column to the evaporating column, means for heating the liquid as it passes to the evaporating column, means for causing an upward flow of liquid through the evaporating column, means for heating the liquid in the preheating column from the top downward with steam of progressively higher temperature and means for returning the residual liquid from the evaporating column to the preheating column.

In testimony whereof I have affixed my signature, this 18th day of July, 1918.

NATHANIEL T. BACON.